(12) United States Patent
Livanos et al.

(10) Patent No.: US 10,805,401 B2
(45) Date of Patent: Oct. 13, 2020

(54) METHOD AND APPARATUS FOR ZERO-TOUCH BULK IDENTITY ASSIGNMENT, PROVISIONING AND NETWORK SLICE ORCHESTRATION FOR MASSIVE IOT (MIOT) DEPLOYMENTS

(71) Applicant: Cisco Technology, Inc., San Jose, CA (US)

(72) Inventors: Konstantin Livanos, Naperville, IL (US); Ian McDowell Campbell, Littleton, CO (US); Swapna Anandan, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 21 days.

(21) Appl. No.: 16/204,895

(22) Filed: Nov. 29, 2018

(65) Prior Publication Data

US 2020/0177678 A1 Jun. 4, 2020

(51) Int. Cl.
| | | |
|---|---|---|
| *H04L 29/08* | (2006.01) | |
| *H04W 4/08* | (2009.01) | |
| *H04W 8/18* | (2009.01) | |
| *H04L 12/24* | (2006.01) | |
| *H04L 29/12* | (2006.01) | |
| *H04W 4/50* | (2018.01) | |

(52) U.S. Cl.
CPC ........ *H04L 67/125* (2013.01); *H04L 41/0893* (2013.01); *H04L 61/1588* (2013.01); *H04L 61/2069* (2013.01); *H04W 4/08* (2013.01); *H04W 4/50* (2018.02); *H04W 8/186* (2013.01)

(58) Field of Classification Search
None
See application file for complete search history.

(56) References Cited

U.S. PATENT DOCUMENTS

| | | | |
|---|---|---|---|
| 9,693,178 | B2 | 6/2017 | Adrangi et al. |
| 9,883,384 | B2 | 1/2018 | Lee et al. |
| 2003/0227899 | A1 | 12/2003 | McCann |
| 2004/0137890 | A1 | 7/2004 | Kalke |
| 2015/0264634 | A1 | 9/2015 | Ding et al. |
| 2017/0026823 | A1 | 1/2017 | Mohammed et al. |
| 2017/0195822 | A1* | 7/2017 | Watfa ...................... H04W 4/08 |
| 2017/0311115 | A1 | 10/2017 | Adrangi et al. |

(Continued)

FOREIGN PATENT DOCUMENTS

CN 101938705 B 6/2013

*Primary Examiner* — Faruk Hamza
*Assistant Examiner* — Cassandra L Decker

(57) ABSTRACT

In one illustrated example, automated or semi-automated system operations for Massive IoT (MIoT) deployment may involve the automatic assignment of external IDs, subscriber IDs (e.g. IMSIs), and mobile network IDs (e.g. MSISDNs) to IoT devices of a group, followed by the provisioning of assigned identities at the relevant network nodes and the IoT devices themselves. The process may continue seamlessly with network slice orchestration for the creation of a network slice instance (NSI) and the provisioning of its associated Network Slice Selection Assistance Information (NS-SAI) and NSI ID at the relevant network nodes. Network Slice Selection Policies (NSSP) may be derived and sent to a policy function and subsequently to IoT devices of the group. Signaling efficiency may be achieved by performing operations on a group basis.

20 Claims, 13 Drawing Sheets

(56) References Cited

U.S. PATENT DOCUMENTS

| | | |
|---|---|---|
| 2017/0332421 A1 | 11/2017 | Sternberg et al. |
| 2018/0092133 A1* | 3/2018 | Starsinic ............. H04L 67/1046 |
| 2018/0109650 A1 | 4/2018 | Berdy et al. |
| 2019/0349852 A1* | 11/2019 | Watfa ...................... H04W 4/08 |
| 2020/0068408 A1* | 2/2020 | Korrapati ............ H04L 41/0813 |
| 2020/0084633 A1* | 3/2020 | Soliman ............ H04W 12/0804 |

\* cited by examiner

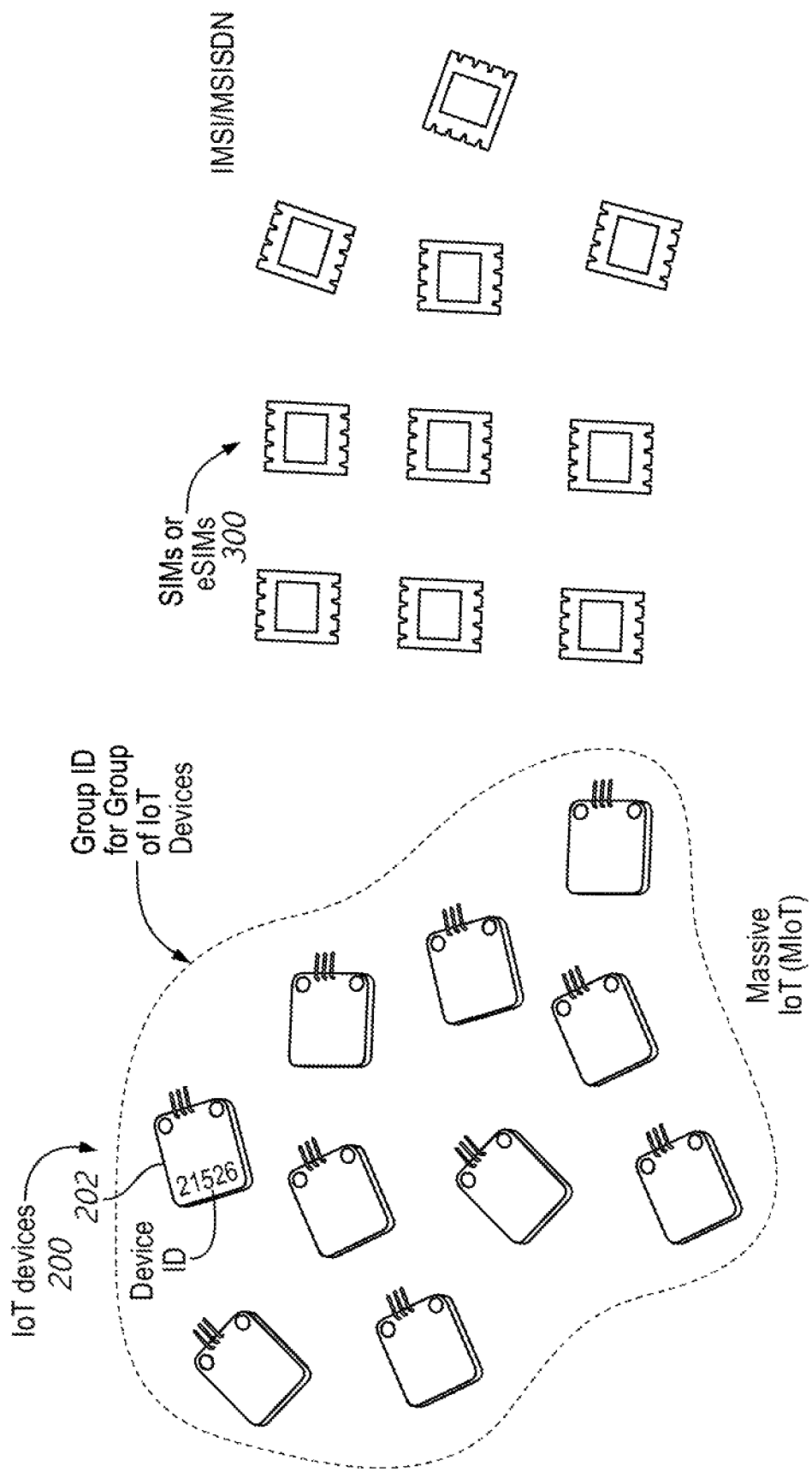

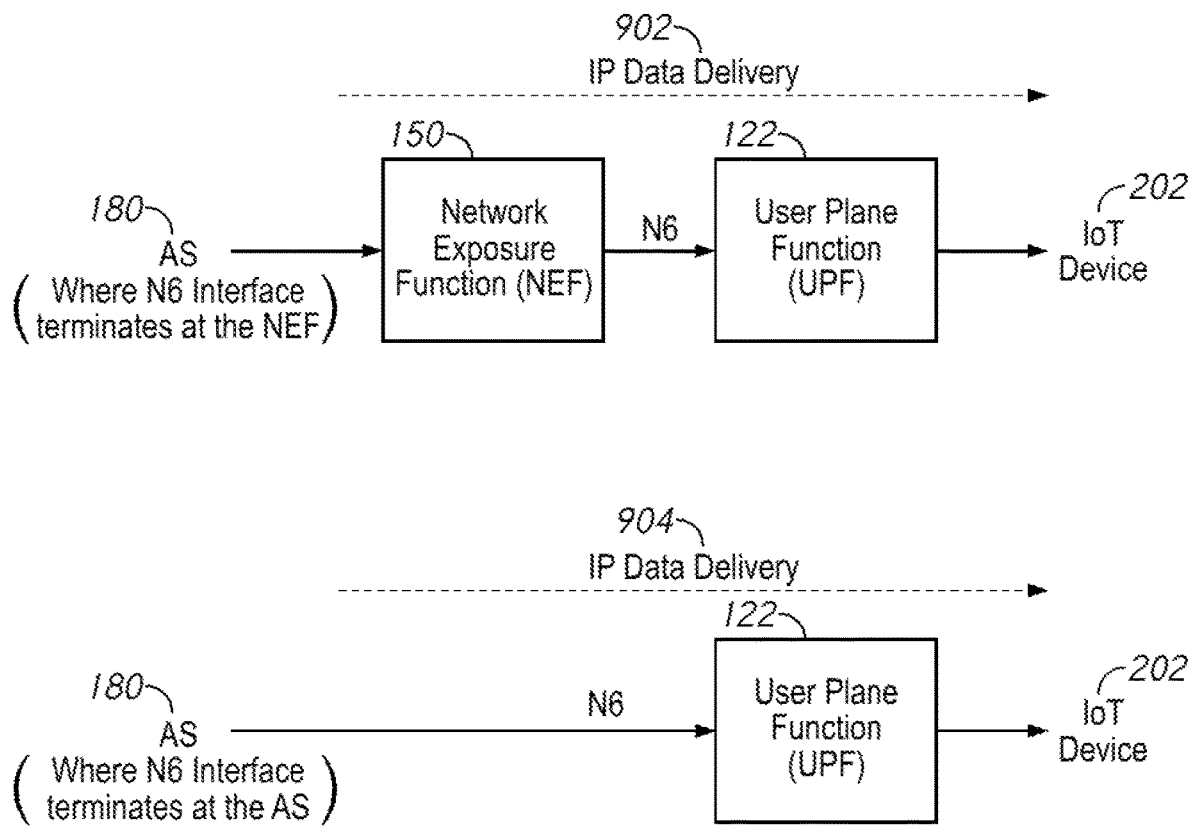
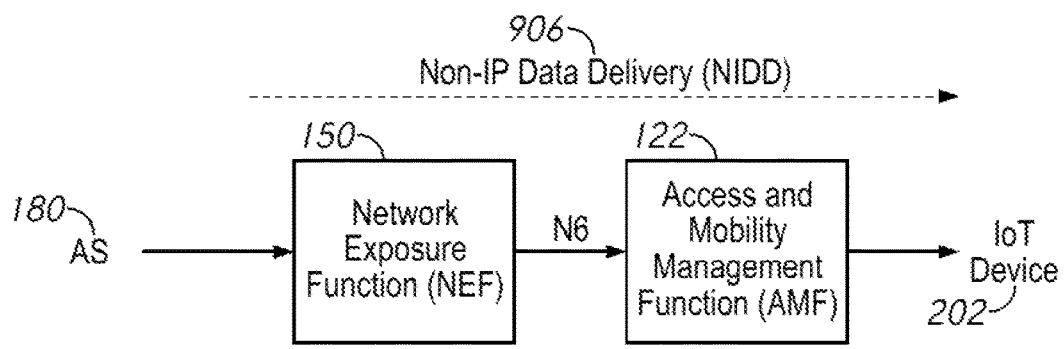
FIG. 9B

US 10,805,401 B2

METHOD AND APPARATUS FOR ZERO-TOUCH BULK IDENTITY ASSIGNMENT, PROVISIONING AND NETWORK SLICE ORCHESTRATION FOR MASSIVE IOT (MIOT) DEPLOYMENTS

TECHNICAL FIELD

The present disclosure relates generally to deploying a plurality of Internet of Things (IoT) devices in a mobile network in a Massive IoT (MIoT) deployment, and more particularly to a zero-touch bulk identity assignment, provisioning, and network slice orchestration for an MIoT deployment.

BACKGROUND

The term "Massive IoT" (MIoT) refers to the connection and use of an incredibly large number (potentially tens of billions) of IoT devices and/or machines for communications via a mobile network. Given the large number of devices in an MIoT deployment, there is a need for efficient methods and apparatus for use in identity assignment, provisioning, and/or network slice orchestration in a mobile network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2 is an illustration of a plurality of Internet of Things (IoT) devices which may be part of a massive IoT (MIoT) deployment in the mobile network of FIGS. 1A-1B;

FIG. 3 is an illustration of a plurality of subscriber identity modules (SIMs) or enhanced SIMs which may be for use with IoT devices in a MIoT deployment;

FIGS. 5A-5B are process flow diagrams involving methods for zero-touch bulk identity assignment and provisioning for the MIoT deployment, and FIGS. 5C-5E are process flow diagrams involving methods for network slice orchestration for the MIoT deployment which may directly and seamlessly follow the methods described in relation to FIGS. 5A-5B;

FIGS. 9A-9B are illustrative representations of example mobile network communication routes between an application server (AS) and an IoT device, which may be utilized after performance the processes for MIoT deployment.

Figure 1A:
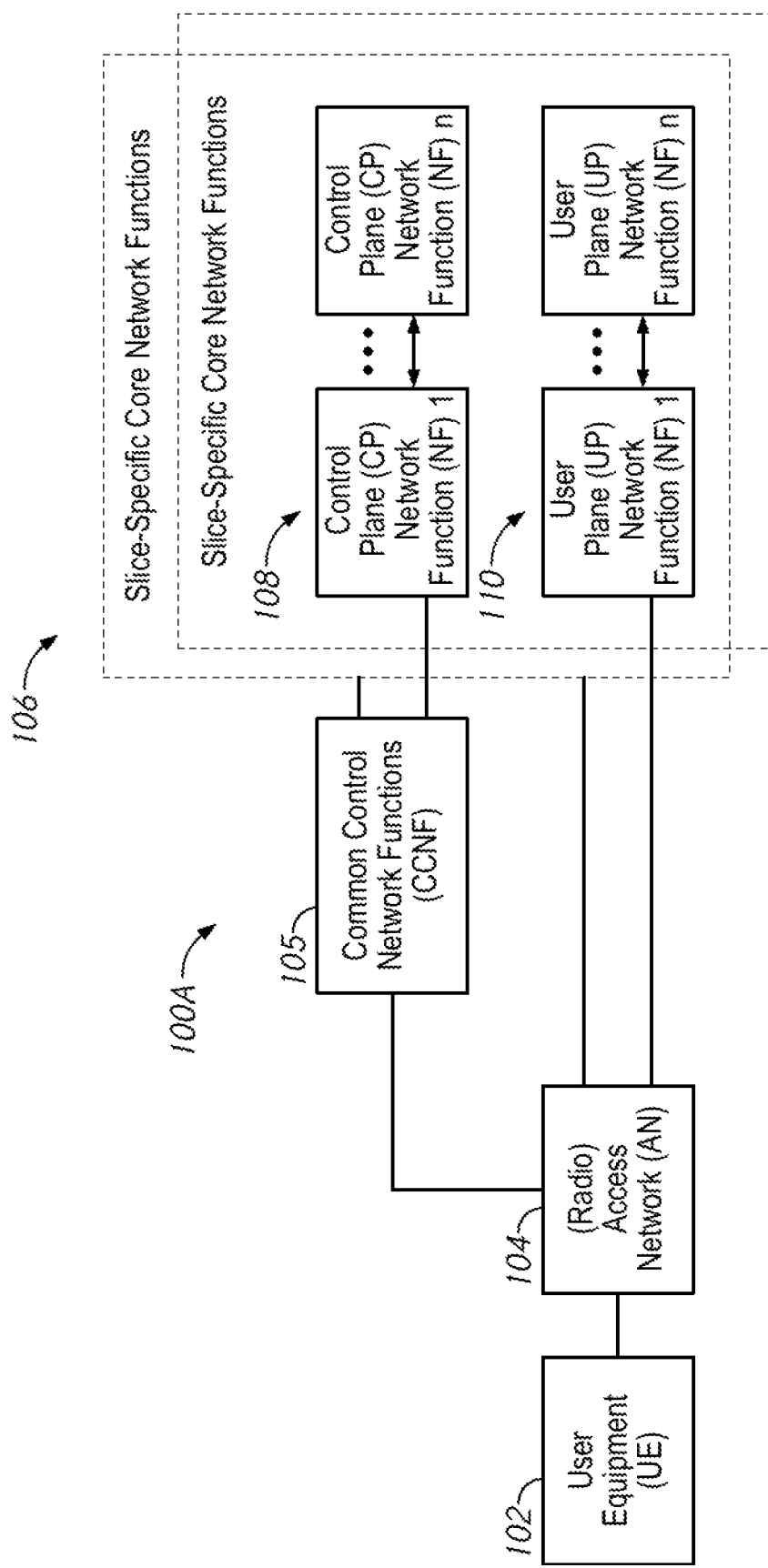
FIG. 1A is an illustrative representation of a basic network architecture of a Fifth Generation (5G) mobile network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Automated or semi-automated system operations for "zero-touch" bulk identity assignment, provisioning, and network slice orchestration for massive IoT (MIoT) deployment in a mobile network are described herein.

In one illustrated example, the operations may involve the automatic assignment of external IDs, subscriber IDs, and mobile network IDs to IoT devices of a group, followed by the provisioning of the assigned identities at relevant network nodes and the IoT devices themselves. In some implementations, operations may continue seamlessly with network slice orchestration for the creation of a network slice instance (NSI) and the provisioning of its associated Network Slice Selection Assistance Information (NSSAI) and NSI ID at the relevant network nodes. Network Slice Selection Policies (NSSP) may also be derived and sent to a policy function and IoT devices of the group. Signaling efficiency may be achieved by performing operations on a group basis.

More detailed and alternative techniques and implementations are provided herein as described below.

Example Embodiments

According to at least some implementations of the present disclosure, massive IoT (MIoT) deployment may be performed with use of automated or semi-automated system operations in a mobile network. The operations may involve the automatic assignment of external identities and network identities (e.g. SUPI/IMSI and MSISDN) to a plurality of IoT devices of a group, and a propagation of mappings of the assigned identities to an operations support system (OSS) domain (e.g. an application server or "AS"), a 5G core network, a 5G Network Exposure Function (NEF), and SIM server for provisioning the IoT devices. Operations may continue seamlessly with network slice orchestration, for the creation of a network slice instance (NSI) and the provisioning of associated Network Slice Selection Assistance Information (NSSAI) and NSI ID at the relevant network nodes. Network Slice Selection Policies (NSSP) may also be derived and sent to a policy function and thereafter to the IoT devices of the group.

To better illustrate, FIG. 1A is an illustrative representation of a network architecture 100A of a 5G mobile network configured to facilitate communications for a user equipment (UE) 102. UE 102 may be an IoT or similar device. In general, network architecture 100a includes common control network functions (CCNF) 105 and a plurality of slice-specific core network functions 106. UE 102 may obtain access to the mobile network via an access network (AN) 104, which may be a radio access network (RAN). In the present disclosure, the UEs operating in the 5G mobile network may be any suitable type of devices, such as cellular telephones, smart phones, tablet devices, IoT devices, and machine-to-machine (M2M) communication devices, to name but a few. Techniques of the present disclosure may involve UEs that are IoT devices in an MIoT deployment.

CCNF 105 includes a plurality of network functions (NFs) which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of common functionalities provided by CCNF 105.

Slice-specific core network functions of network slices 106 are separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
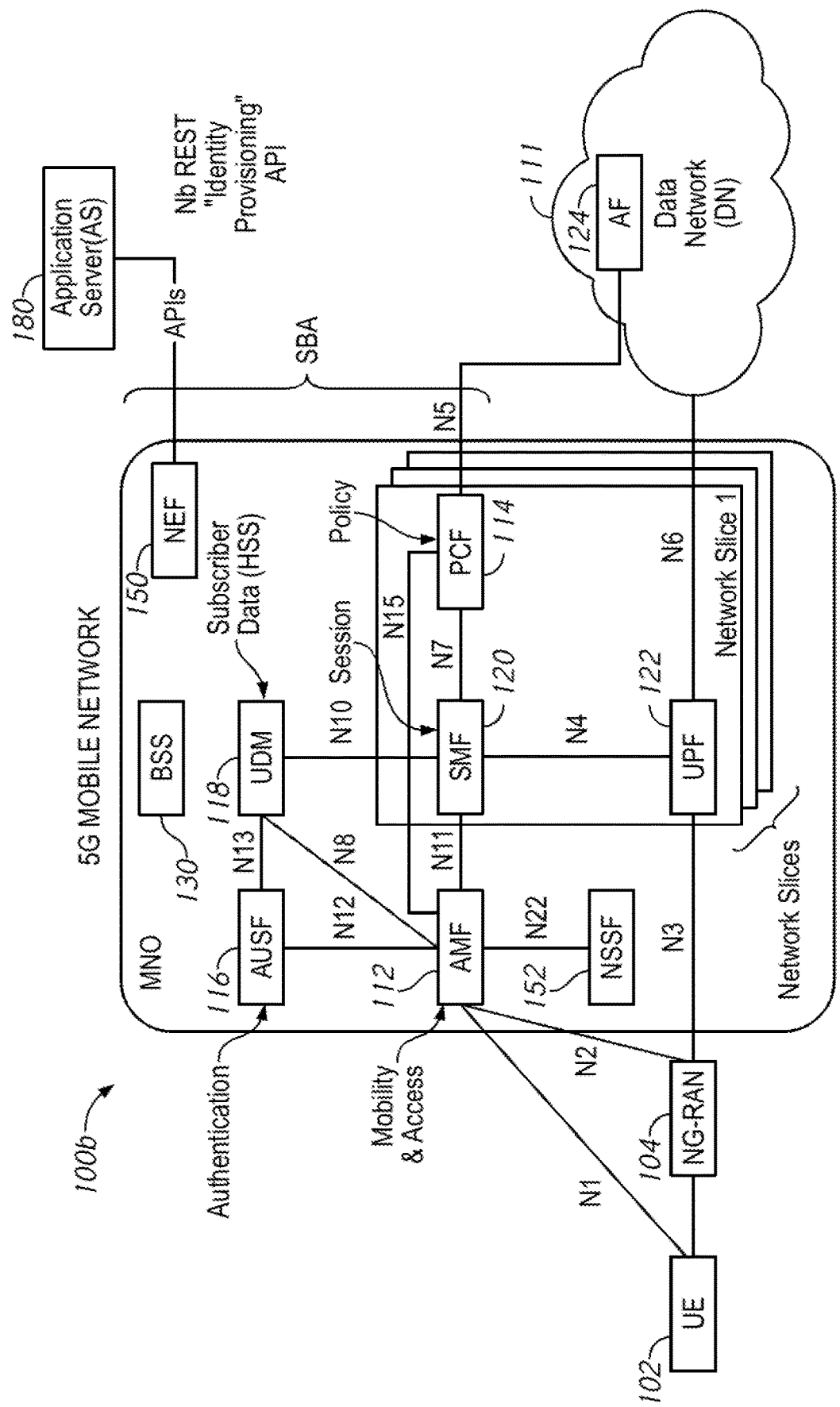
FIG. 1B is an illustrative representation of a more detailed network architecture of the mobile network of FIG. 1A.

FIG. 1B is an illustrative representation of a more detailed network architecture 100B of the 5G mobile network of FIG. 1A. As provided in 3GPP standards for 5G (e.g. 3GPP 23.501 and 23.502), network architecture 100b for the 5G mobile network which is operated by a mobile network operator (MNO) may include an authentication server function (AUSF) 116, a unified data management (UDM) 118 (having a unified data repository or UDR), an AMF 112, a policy control function (PCF) 114, an SMF 120, and a UPF 122. A plurality of interfaces and/or reference points N1-N8, N10-N13, N15, and N22 shown in FIG. 1B (as well as others) may define the communications and/or protocols between each of the entities, as described in the relevant (evolving) standards documents. One or more application functions, such as an application function (AF) 124, of a data network (DN) 111 may connect to the 5G mobile network via PCF 114 or UPF 122.

UPF 122 is part of the user plane and all other NFs (i.e. AMF 112, SMF 120, PCF 114, AUSF 116, and UDM 118) are part of the control plane. Separation of user and control planes guarantees that each plane resource can be scaled independently; it also allows UPFs to be deployed separately from CP functions in a distributed fashion. The NFs in the CP are modularized functions; for example, AMF and SMF are independent functions allowing for independent evolution and scaling. As specifically illustrated in FIG. 1B, NFs such as SMF 120 and UPF 122 of FIG. 1B may be provided as specific instances in a first network slice (e.g. network slice 1) of a plurality of network slice instances made available in the mobile network.

Also shown in the mobile network is a network exposure function (NEF) 150. In general, NEF 150 may be configured to receive information from other NFs (e.g. based on exposed capabilities of other NFs) and store the received information as structured data. The storage operations may be performed with use of a standardized interface to a data storage network function (e.g. UDM 118). The stored information may be re-exposed by NEF 150 to other NFs and used for other purposes (e.g. analytics). One example use of NEF 150 is to assist in the establishment of an AS-initiated communication with a UE/IoT device, from an application server (AS) 180 through an API (e.g. where no other existing data connection exists).

FIG. 2 is an illustration of a plurality of IoT devices 200 which may be part of a massive IoT (MIoT) deployment in a mobile network (e.g. the 5G mobile network of FIGS. 1A-1B). The IoT devices 200 may be part of a group of IoT devices configured to communicate with an AS via a mobile network (e.g. the AS 180 of mobile network of FIG. 1B). Each one of the IoT devices 200, such as an IoT device 202, may be assigned with a (unique) device ID. This device ID may be assigned by the manufacturer of the IoT device. In the mobile network, the entire group of IoT devices 200 may be associated with a (unique) group ID. Although FIG. 2 illustrates for clarity only ten (10) devices in the group, there will typically be a much larger number IoT devices in a group, for example, on the order of hundreds, thousands, or millions of devices.

FIG. 3 is an illustration of a plurality of subscriber identity modules (SIMs) 300 or enhanced SIMs (eSIMs) which may be for use with IoT devices in a MIoT deployment. Each one of the SIMs 300 may be assigned with a (unique) ID or subscriber ID, such as an International Mobile Subscriber Identity (IMSI). Each one of SIMs 300 may also be assigned or associated with a (unique) mobile network ID, such as a Mobile Station International Subscriber Directory Number (MSISDN). Pairing with the IoT devices 200 of FIG. 2, each one of SIMs 300 will be matched with an IoT device of FIG. 2; the number of SIMs 300 of FIG. 3 will match the number of IoT devices 200 of FIG. 2. Although FIG. 3 illustrates for clarity only ten (10) devices, there will typically be a much larger number of SIMs, for example, on the order of hundreds, thousands, or millions of modules.

Figure 4:
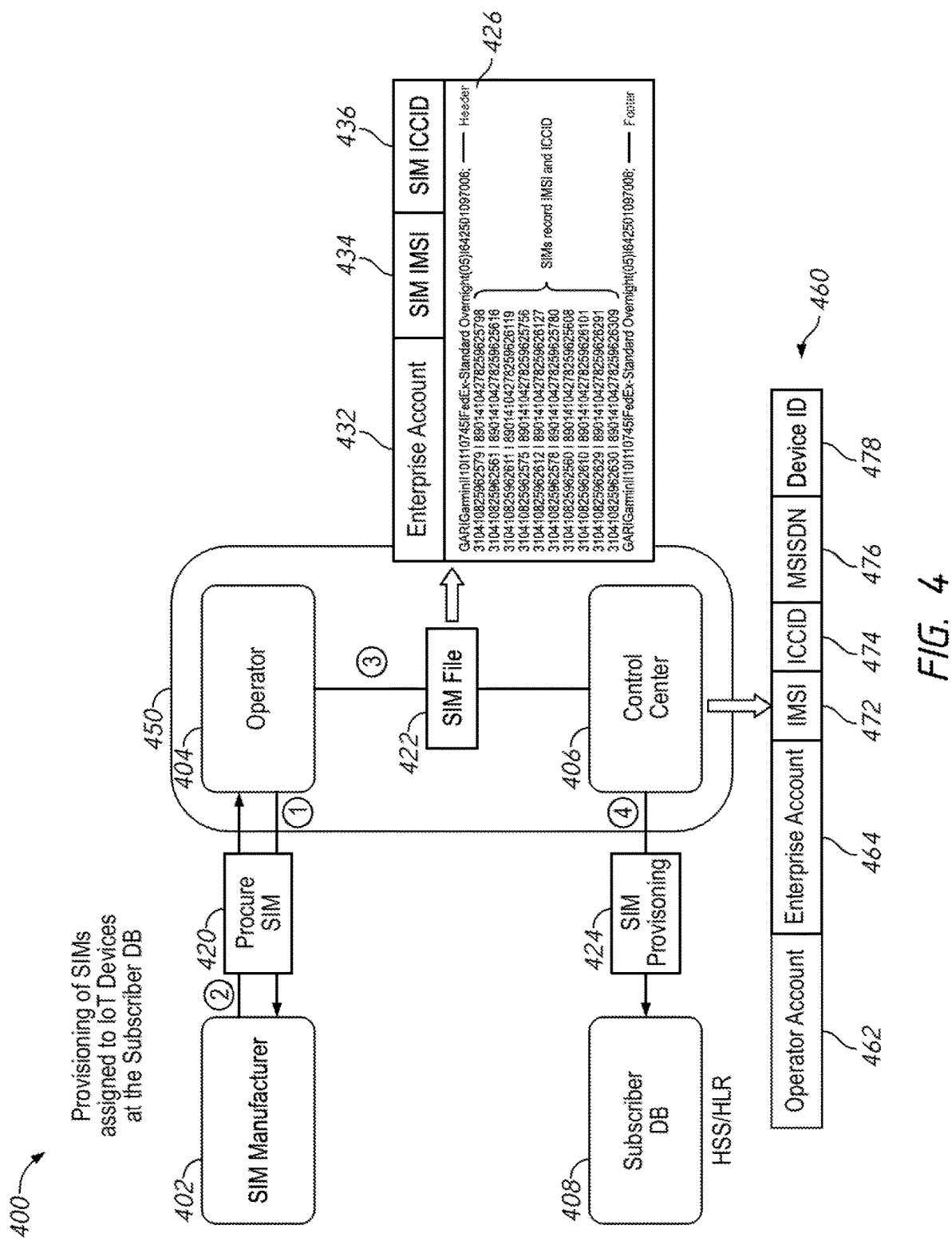
FIG. 4 is an illustrative representation of a system for use in SIM provisioning of IoT devices in a mobile network.

FIG. 4 is an illustrative representation of a system 400 for use in provisioning SIMs for IoT devices in a mobile network. System 400 may include a SIM manufacturer 402, a mobile operator 404, a control center 406, and a subscriber database 408 (e.g. a home subscriber server or "HSS" and/or home location register or "HLR"). SIM manufacturer 402 may be, for example, Giesecke+Devrient Mobile Security GmbH ("G+D") of Munich, Germany. Control center 406 may be configured to provision SIMs associated with IoT devices in the subscriber database 408. Control center 406 may be, for example, the Cisco Jasper Control Center from Cisco Jasper of Santa Clara, Calif., U.S.A.

In FIG. 4, a SIM procurement procedure 420 may be initiated by mobile operator 404 (step 1 of FIG. 4) for the ordering and receiving of SIMs from SIM manufacturer 402 (step 2 of FIG. 4). Mobile operator 404 may receive one or more SIM information files 422 associated with the procured SIMs, which is sent to control center 406 (step 3 of FIG. 4). As illustrated in a table 426, SIM information file 422 may include (enterprise) account details 432, subscriber IDs (e.g. IMSIs), and SIM Integrated Circuit Card Identifications (ICCIDs). A SIM provisioning procedure 424 may be performed by control center 406 for provisioning the SIMs in subscriber database 408 (step 4 of FIG. 4). Control center 406 is able to generate IMSI to MSISDN mappings, as well as allow SIM profile updates from the SaaS platform. Provisioning may be facilitated with data 460 which include, for each SIM/IoT device, operator account data 462, enterprise account data 464, an IMSI 472, an ICCID 474, an MSISDN 476, and a device ID 478. Device ID 478 may be a custom data field populated by mobile operator 404 or the enterprise, independent of subsequently-assigned network identifiers.

In the above-described environment or similar environment, there is a need for efficient methods and apparatus for use in identity assignment, provisioning, and/or network slice orchestration for an MIoT deployment of IoT devices.

According to at least some implementations, automated or semi-automated system operations of the present disclosure may involve the assignment of external IDs and mobile network IDs (e.g. IMSIs and MSISDNs) to IoT devices of a group and the provisioning of the assigned identities at relevant mobile network entities (e.g. the UDM, the NEF, and the AS of the OTT/Enterprise domain) and the IoT devices themselves. Once the assignment and provisioning are complete, Operations may continue seamlessly with network slice orchestration for the creation of a network slice instance (NSI) and the provisioning of associated Network Slice Selection Assistance Information (NSSAI) at relevant mobile network entities (e.g. the UDM and NSSF). Further, Network Slice Selection Policies (NSSP) may be derived and sent to the PCF and IoT devices of the group. Advantageously, signaling efficiency may be achieved by performing operations on a group basis.

Figure 5A:
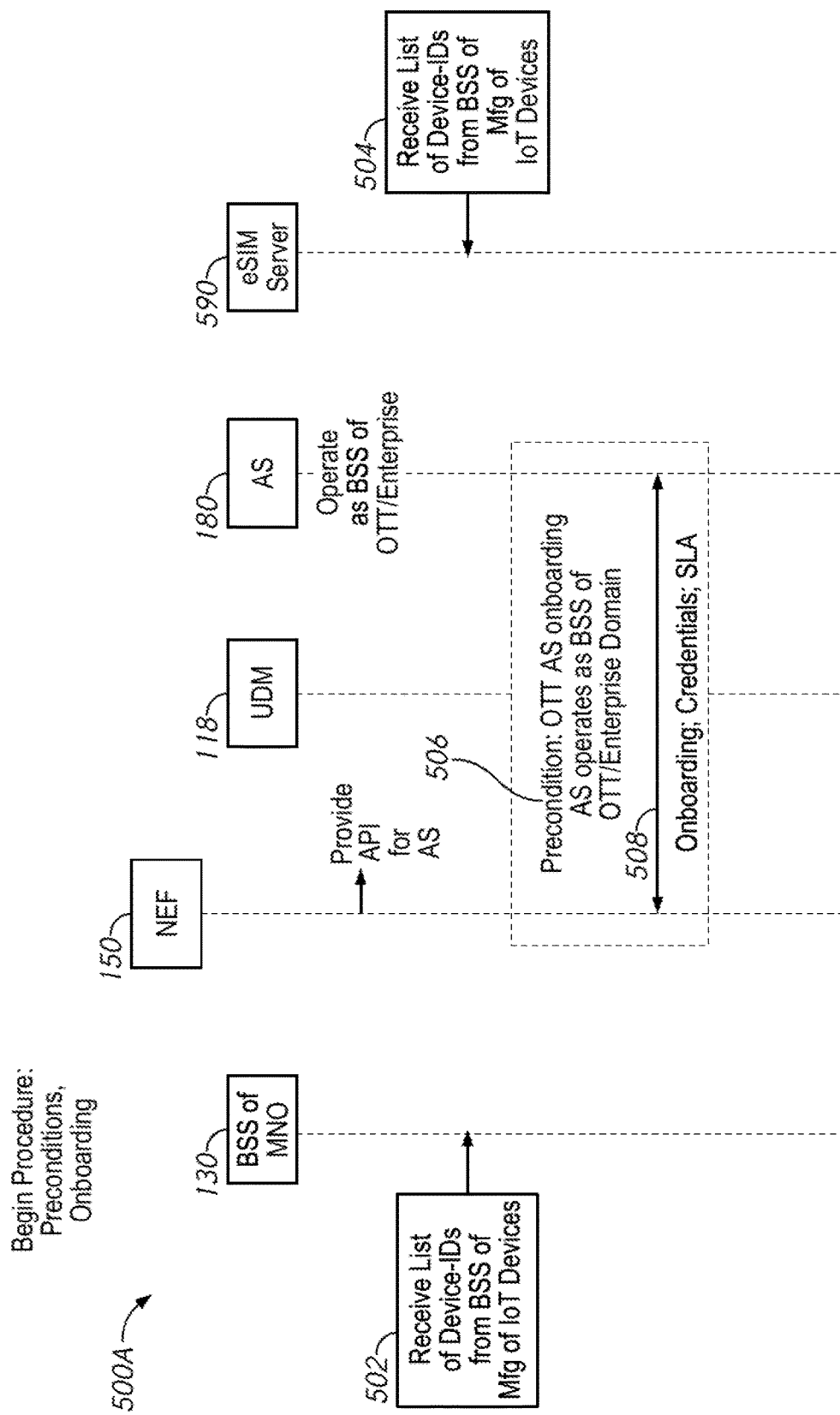
FIGS. 5A-5E are process flow diagrams for describing automated or semi-automated system operations for "zero-touch" bulk identity assignment, provisioning, and network slice orchestration for a massive IoT (MIoT) deployment according to some implementations of the present disclosure, where
Figure 5B:
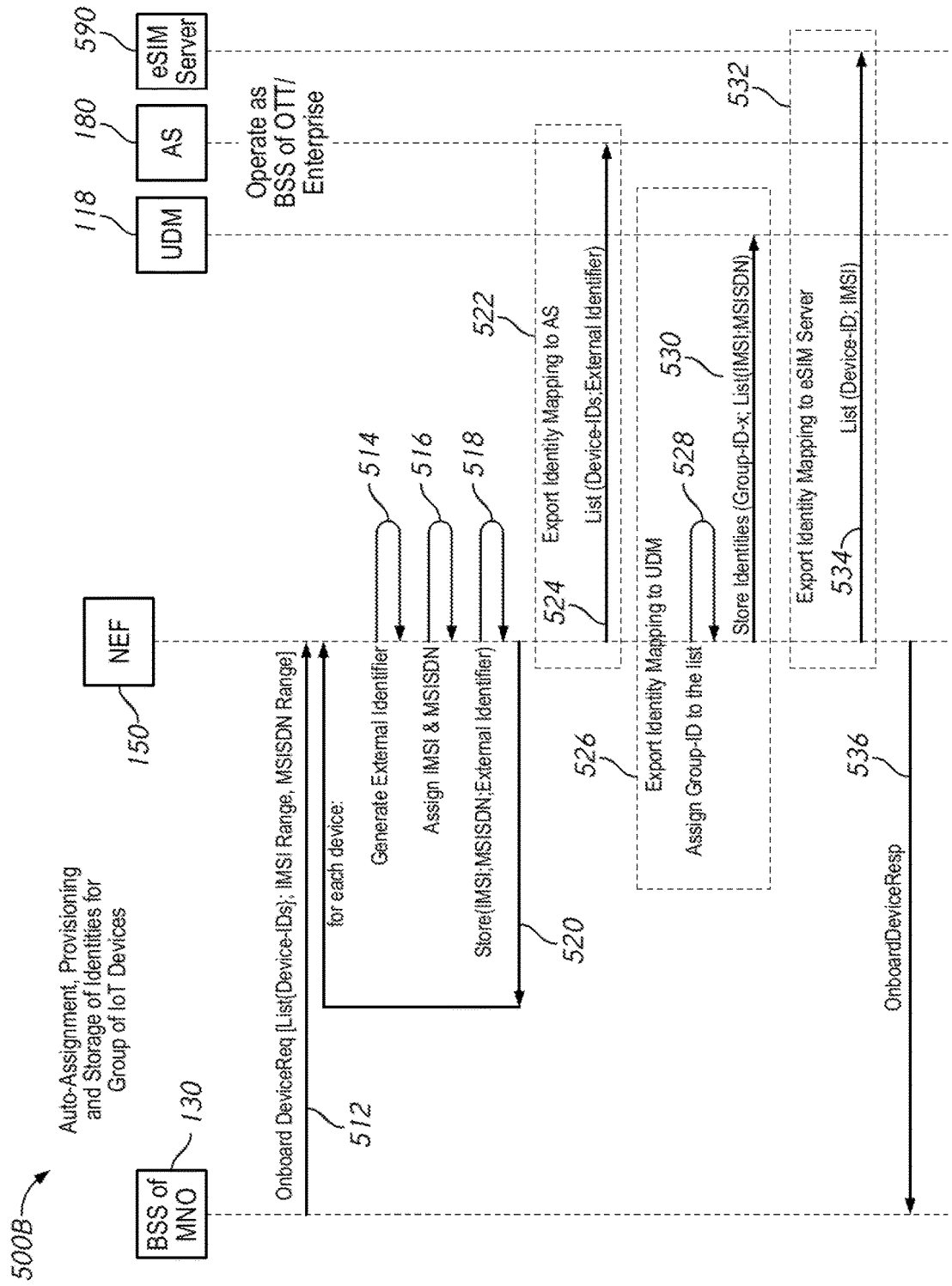
Figure 5C:
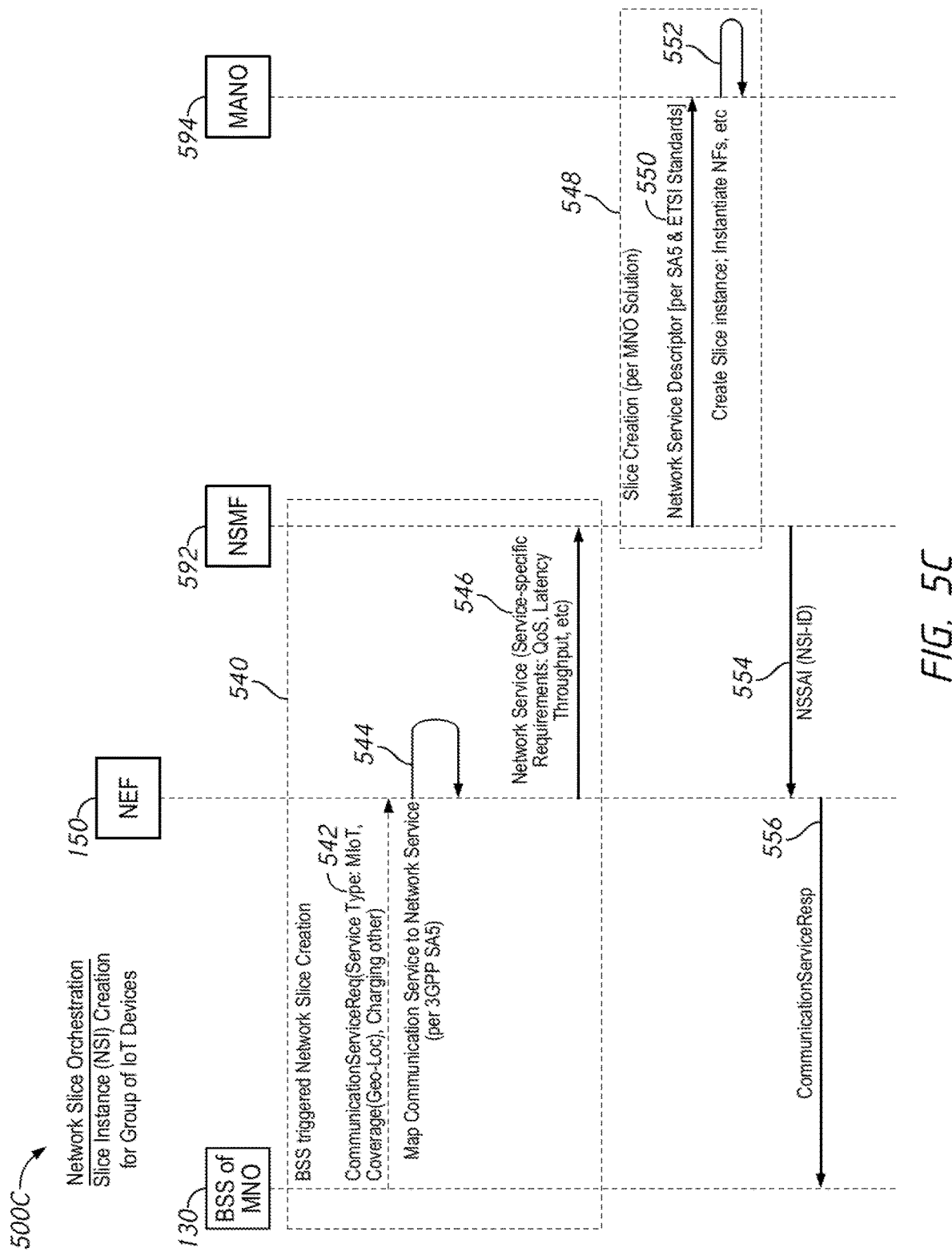
Figure 5D:
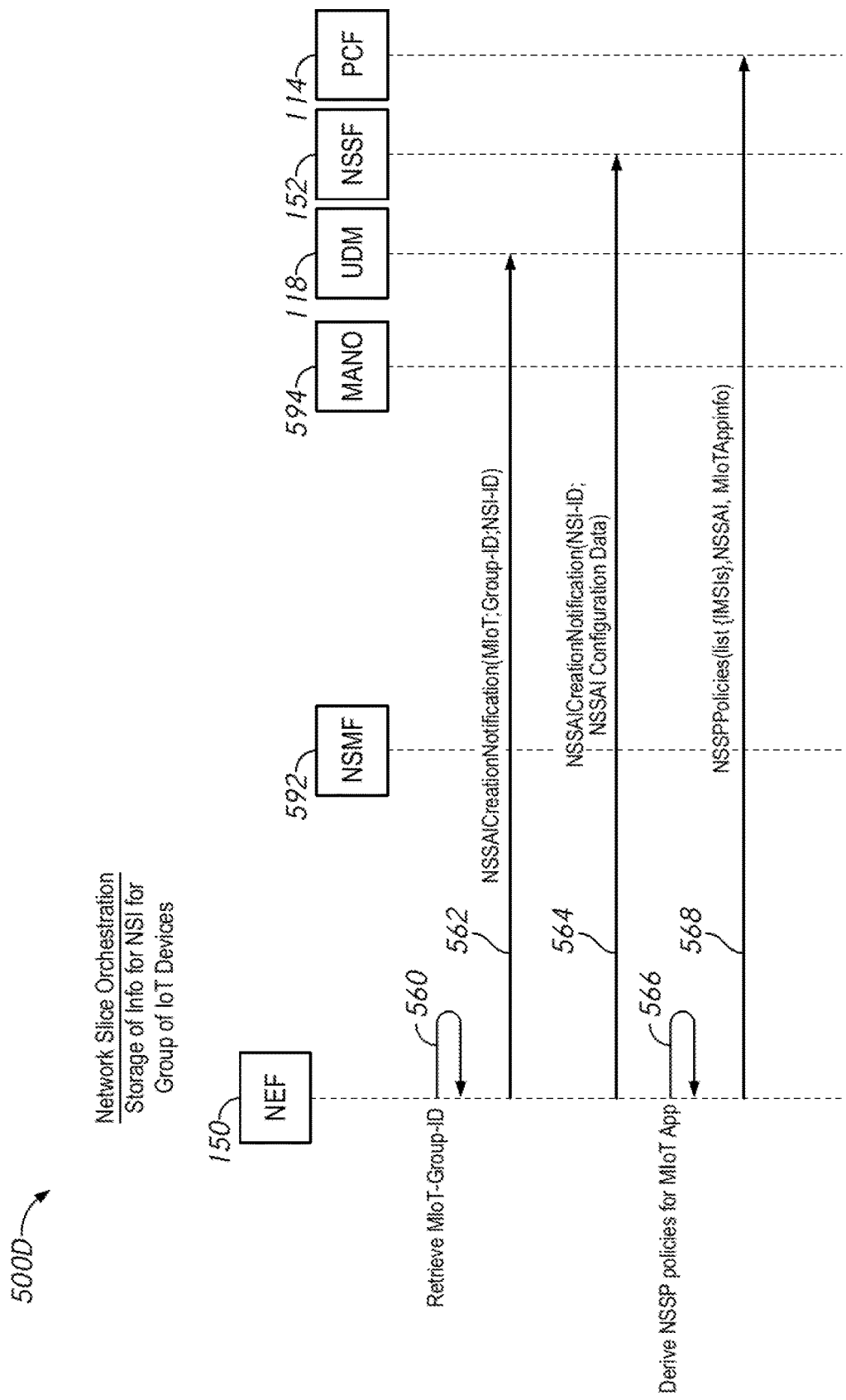
Figure 5E:
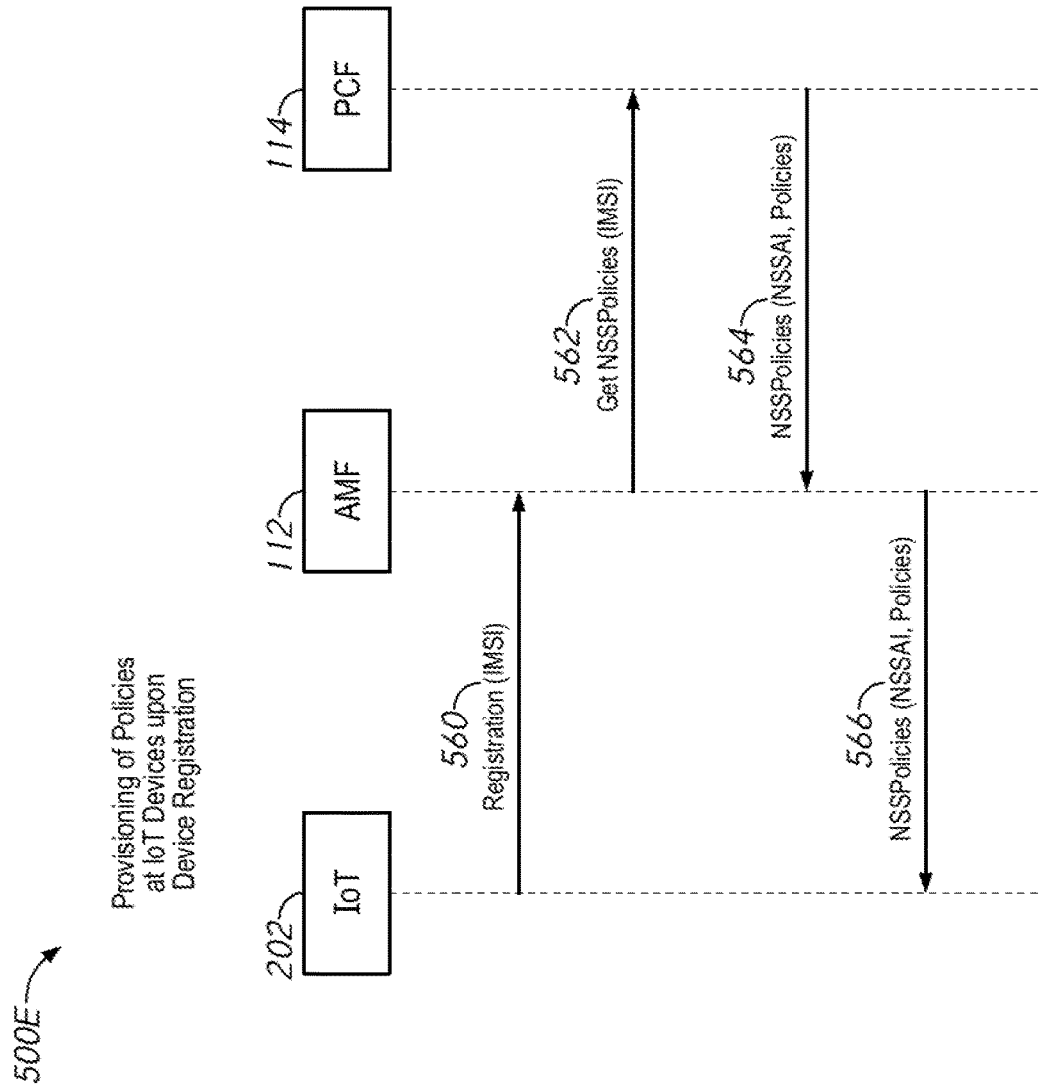

To better illustrate, FIGS. 5A-5E are process flow diagrams for describing automated or semi-automated system operations for "zero-touch" bulk identity assignment, provisioning, and network slice orchestration for an MIoT deployment according to some implementations of the present disclosure. More particularly, FIGS. 5A-5B are process flow diagrams 500A and 500B relating to methods for zero-touch bulk identity assignment and provisioning for the MIoT deployment, whereas FIGS. 5C-5E are process flow diagrams 500C and 500D relating to methods for network slice orchestration for the MIoT deployment which may directly and seamlessly follow the methods described in relation to FIGS. 5A-5B.

Such methods may be performed at one or more mobile network nodes as will be described below. Such a network node may include one or more processors and one or more memories coupled to the one or more processors. The methods may be embodied as a computer program product (e.g. memory) including a non-transitory computer readable medium and instructions stored in the computer readable medium, where the instructions are executable on one or more processors of the network node for performing the steps of the methods.

In particular, and as described earlier, NEF 150 may be generally configured for exposure of services and capabilities of a mobile network, and also for interfacing with AS 180 for communication of data via the mobile network. In preferred implementations, NEF 150 is suitably configured with additional, enhanced functionality according to techniques of the present disclosure as described herein.

Beginning with the process flow diagram 500A of FIG. 5A, BSS 130 of the MNO may receive a list of devices IDs assigned to and associated with the plurality of IoT devices of a group (step 502 of FIG. 5A). The list of device IDs may be received from a BSS of a manufacturer of the IoT devices. Similarly, a SIM server 590 may receive a (same) list of devices IDs assigned to and associated with IoT devices of the group (step 504 of FIG. 5A). Again, the list of device IDs may be received from the BSS of the IoT device manufacturer.

For the procedure, NEF 150 may be provided with an Nb interface, and expose and/or publish an Nb REST "Identity Provisioning" API for an operations support system (OTT) or enterprise domain. AS 180 may operate as a BSS of the OTT or enterprise domain (step 506 of FIG. 5A). AS 180 may be onboarded and authenticated at the NEF 150, where credentials and service level agreement (SLA) data may be transferred (step 508 of FIG. 5B).

Processes may continue with the process flow diagram 500B of FIG. 5B, which illustrates a procedure for zero-touch bulk identity assignment and provisioning for the MIoT deployment. NEF 150 may receive from a server of BSS 130 one or more messages which indicate a request for bulk onboarding of identities associated with the plurality of IoT devices (step 512 of FIG. 5B). The plurality of IoT devices may be a group of IoT devices configured for communications with AS 180 via the mobile network (e.g. mobile network of FIGS. 1A-1B). The one or more messages may include or otherwise identify a plurality of device IDs assigned to the IoT devices, a plurality of subscriber IDs assigned to the plurality of SIMs, and the plurality of mobile network IDs. Here, the subscriber IDs may be IMSIs; the mobile network IDs may be MSISDNs. The one or more messages may include one or more lists of IDs and/or one or more ranges of IDs.

In FIG. 5B, the following procedure may be performed for each device ID of the plurality of device IDs assigned to the IoT devices of the group. In general, NEF 150 may assign a plurality of identities to the device ID. More specifically, NEF 150 may generate and assign an external ID to the device ID (step 514 of FIG. 5B). In addition, NEF 150 may select and assign a subscriber ID (e.g. IMSI) and a mobile network ID (e.g. MSISDN) to the device ID (step 516 of FIG. 5B). NEF 150 may then store in memory (e.g. NEF or NEF-accessible memory) one or more associations between the device ID and the assigned identities (step 518 of FIG. 5B). The procedure may be repeated for each device ID (step 520 of FIG. 5B).

Identity mappings may then be exported to the AS 180 (step 522 of FIG. 5B). More specifically, NEF 150 may send to AS 180 one or more messages which include or otherwise identify the external IDs and/or the device IDs, and/or the assignments and/or associations therebetween (step 524 of FIG. 5B). The external IDs may be subsequently used by AS 180 to address the IoT devices for communications.

Identity mappings may also be exported to the UDM 118 (step 526 of FIG. 5B). More specifically, a group ID may be generated and assigned to the group (step 528 of FIG. 5B). The NEF 150 may then send to UDM 118 one or more messages which include or otherwise identify the group ID along with the subscriber IDs and the mobile network IDs (step 530 of FIG. 5B), for UDM/UDR storage of the group ID in association with the subscriber IDs and the mobile network IDs of group. Note that the group ID may be subsequently used in one or more other processes (e.g. later in relation to step 560 of FIG. 5D).

Identity mappings may also be exported to SIM server 590 (step 532 of FIG. 5B). More specifically, NEF 150 may send to SIM server 590 one or more messages which include or otherwise identify the device IDs and/or the subscriber IDs, and/or the assignments or associations therebetween (step 534 of FIG. 5B). The assigned identities may be used by SIM server 590 for a subsequent provisioning of the IoT devices of the group.

NEF 150 may then send a message to BSS 130 of MNO for acknowledgement, for example, a message which indicates an onboard device response to the initial onboarding device request of step 512 (step 536 of FIG. 5B). In some implementations, the acknowledgement message of step 536 may be used by BSS 130 of MNO as a trigger to initiate subsequent processes of FIG. 5C (e.g. trigger the messaging of subsequent step 542 of FIG. 5C).

Note that, in some alternative implementations of FIG. 5B, the AS 180 which operates as a BSS in the OTT domain may send to NEF 150 a list of the device IDs of the IoT devices, where NEF 150 is pre-provisioned with the IMSI and MSISDN ranges to assign to the device IDs or alternatively obtain this information from BSS 130.

Processes may continue with the process flow diagram 500C of FIG. 5C, which (e.g. together with FIG. 5D) illustrates an automated or semi-automated for network slice orchestration. The process of FIG. 5C may follow directly and seamlessly after the process of FIG. 5B. Here, NEF 150 may operate as a network slice controller and/or a communications service management function (CSMF). As illustrated in FIG. 5C, the process flow may involve use of a network slice management function (NSMF) 592 together with a network functions virtualization management and orchestration (MANO) 594 according to some implementations.

In FIG. 5C, the procedure may begin with a process for creating a network slice instance (NSI) for the group of IoT devices (step 540 of FIG. 5C). Here, NEF 150 may initially receive from the server of BSS 130 one or more messages which indicate a request for communication service for the group of IoT devices (step 542 of FIG. 5C). Thus, BSS 130 of the MNO may trigger the instantiation of the network slice for the group of IoT devices. Again, the acknowledgement message of step 536 of FIG. 5B may be used by BSS 130 of MNO as a trigger to initiate the messaging of this step 542 of FIG. 5C.

The one or more message of step 542 of FIG. 5C may include or otherwise identify a communication service description associated with the requested communication service. The communication service description may indicate a service type corresponding to MIoT, a coverage type associated with a specified geo-location, a charging type, as well as other information.

NEF 150 may map the received communication service description to network service requirements of the mobile network (step 544 of FIG. 5C). Here, NEF 150 may derive or select appropriate network service requirements according to the communication service description. The network service requirements may be or include one or more Quality of Service (QoS) parameters, one or more latency parameters, one or more throughput or bandwidth (BW) parameters, etc. Specifically, step 544 may be performed per the 3GPP "SA5" specification (Service and System Aspects 5=Telecom Management).

NEF 150 may then send to NSMF 592 one or more messages which indicate a request for creating an NSI according to the selected network service requirements (step 546 of FIG. 5C). In response, NSMF 592 together with MANO 594 may create the NSI (step 548 of FIG. 5C). The NSI may be created according to a specified practice of the MNO.

Here, NSMF 592 may send to MANO 594 one or more messages which indicate a request for NSI creation and include a network service descriptor (step 550 of FIG. 5C). The process may be performed according to 3GPP SA5 and/or ETSI standards. Here, MANO 594 may create an NSI and associated NFs according to the network service descriptor (step 552 of FIG. 5C). Here, network slice selection assistance information (NSSAI) configuration data and an NSI ID associated with the NSI may be generated. NEF 150 may then receive from NSMF 592 one or more messages which indicate a response to the request for creating the NSI of step 546 (step 554 of FIG. 5C). The one or more messages may include the NSSAI configuration data and the NSI ID associated with the created NSI and associated NFs. NEF 150 may send to BSS 130 one or more messages which indicate a response to the request for communication service of previous step 542 (step 556 of FIG. 5C).

Processes may continue with the process flow diagram 500D of FIG. 5D, which continues the automated or semi-automated procedure for network slice orchestration. More specifically, process flow diagram 500D of FIG. 5D relates to the storage of information for the created NSI. The process of FIG. 5D may follow directly and seamlessly after the process of FIG. 5C.

In FIG. 5D, NEF 150 may obtain or retrieve from memory the group ID of the group of IoT devices (step 560 of FIG. 5D). The obtaining of the group ID in step 560 may be performed directly after and/or in response to the receipt of the one or more messages from the NSMF indicating the response to the NSI creation create of step 554 of FIG. 5C. NEF 150 may then send to the UDM 118 one or more messages which include the group ID of the group and the NSI ID associated with the created network slice (step 562 of FIG. 5D), for UDM/UDR storage of the NSI ID in association with the group ID and/or the associated subscriber and mobile network IDs. This may be considered a notification or indication to the UDM/UDR of the creation of the NSI for the group of IoT devices. NEF 150 may then send to NSSF 152 one or more messages which include the NSSAI configuration data and the NSI ID (step 564 of FIG. 5D), for NSSF storage of the NSSAI configuration data and the NSI ID.

NEF 150 may also derive Network Slice Selection Policies (NSSP) based on a profile associated with the AS (e.g. an SLA profile) (step 566 of FIG. 5D). The profile of the AS may have been received earlier in step 508 of FIG. 5A. NEF 150 may then send to PCF 114 one or more messages which include the NSSP, the NSSAI, the plurality of subscriber IDs of the group, and MIoT application information (step 568 of FIG. 5D), for storage of the NS SP in association with the NSSAI, the subscriber IDs of the group, and the MIoT application information.

Processes may continue with the process flow diagram 500E of FIG. 5E which may be performed for each IoT device 202 of the group. More specifically, process flow diagram 500E of FIG. 5E relates to the provisioning of the NS SP at the IoT devices themselves. The process of FIG. 5D may follow after the process of FIG. 5C for each device.

In FIG. 5E, IoT device 202 may send to AMF 112 a message for registration or attachment (step 560 of FIG. 5E). The message may include or otherwise indicate the IMSI of the IoT device 202. In response, AMF 112 may send to PCF 114 a message which indicates a request for the NSSP based on the IMSI of the IoT device 202 (step 562 of FIG. 5E). PCF 114 may selectively retrieve the NSSP according to the IMSI of the IoT device 202, and send or return the retrieved NSSP to the AMF 112 (step 564 of FIG. 5E). The NSSP may include the NSSAI and the associated policies. AMF 112 may send to the IoT device 202 the NSSP as a response to the request of previous step 562 (step 566 of FIG. 5E). Subsequently, IoT device 202 may use the NSSP and/or NSSAI in communications with its associated AS.

Figure 6:
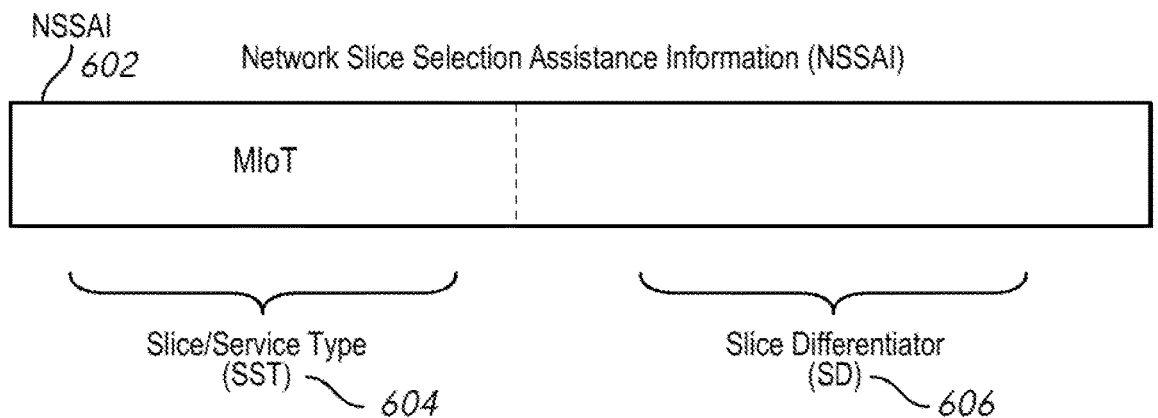
FIG. 6 is a message format associated with network slice selection assistance information (NSSAI) which may be generated and stored in response to the creation of a network slice instance (NSI) in the methods of FIGS. 5C-5D.

FIG. 6 is a message format of network slice selection assistance information (NSSAI) 602 which may be generated and stored in response to the creation of the NSI in the processes of FIGS. 5C-5D. As shown, NSSAI 602 may include a slice/service type (SST) 604 and a slice differentiator (SD) 606. SSTs are high-level categories for NSIs, which reflect the distinct requirements for network solutions. Currently, three fundamental SSTs are defined for 5G: (1) enhanced mobile broadband (eMBB); (2) ultra-reliable low latency communications (URLLC); and (3) MIoT. In the present techniques, the SST 604 may be set to "MIoT."

Figure 7:
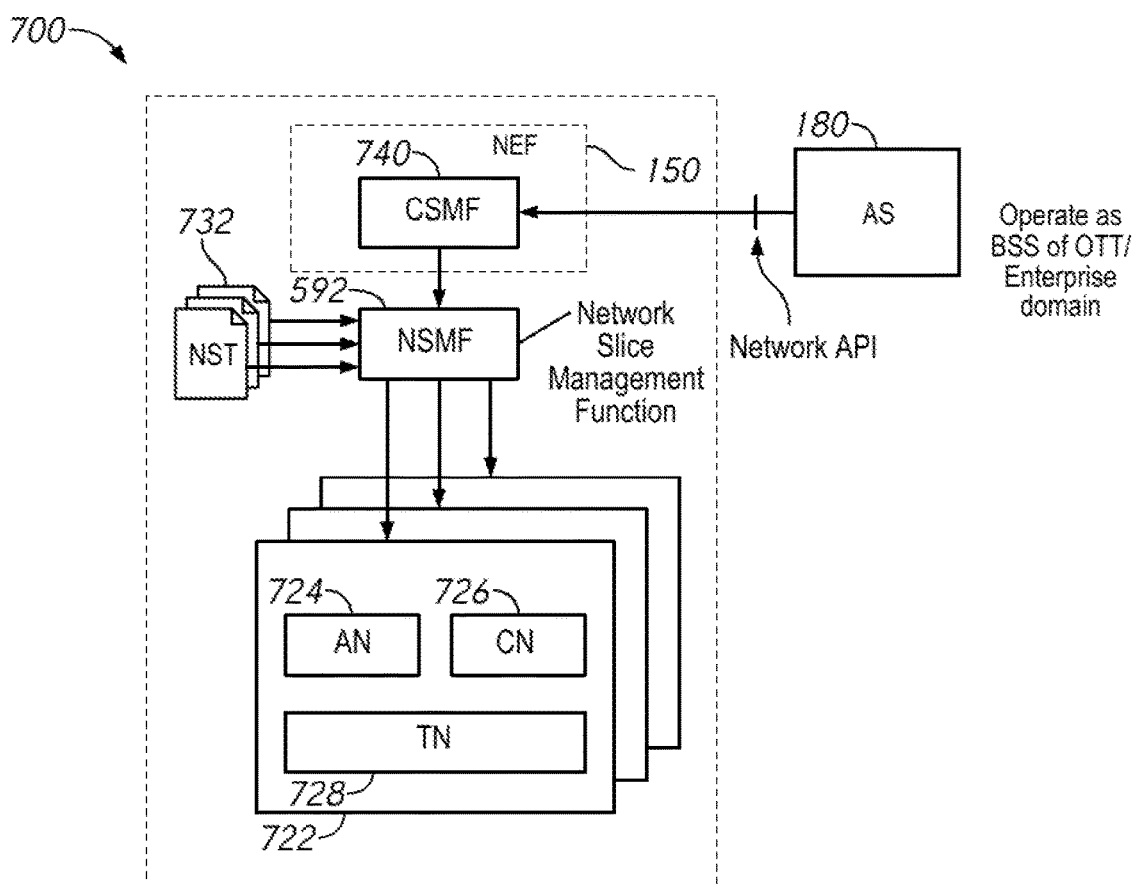
FIG. 7 is an illustrative representation of a system for use in network slice creation according to some implementations of the present disclosure.

Referring now to FIG. 7, an illustrative representation of a system 700 for use in network slice creation according to some implementations of the present disclosure is shown. System 700 may include a communication service management function (CSMF) 740 in communication with NSMF 592. Here, CSMF 740 may be part of NEF 150. As described previously, AS 180 may utilize the Nb REST Identity Provisioning" API with the NEF. AS 180 may send to CSMF 740 of the NEF a communication service description according to a communication service request. CSMF 740 of the NEF may receive the communication service description and select network service requirements according to such description. CSMF 740 of the NEF may translate the selected network service requirements into slice-specific requirements. CSMF 740 may send the slice-specific requirements to NSMF 592. At NSMF 592, a selected one of a plurality of network slice templates (NSTs) 732 may be used to create NSI 722 according to the slice-specific requirements. The selected NST 732 may provide the created NSI 722 with required instance specific policies and configurations. The created NSI 722 may include associated NFs, such as an access network (AN) function 724, a core network (CN) function 726, and a transport network (TN) function 728.

In general, an NSI is the instantiation of a network slice. A network slice is a logical network that may include a set of network functions, which may be Virtual Network Functions (VNFs) or Physical Network Functions (PNFs), and corresponding resources, such as compute, storage, and networking resources. It may be considered to be "sliced out" from the "physical" network in order to provide specific capabilities and characteristics that the application running within the slice requires. Specific capability and characteristics may be or include customized connectivity with ultra-low latency, extreme reliability, and/or value-added services, as necessary and/or configured. A slice may also be viewed as a unique profile for an application, defined as a set of services within the network, or as a network function chain built to support a given use case, traffic type or a customer.

Figure 8:
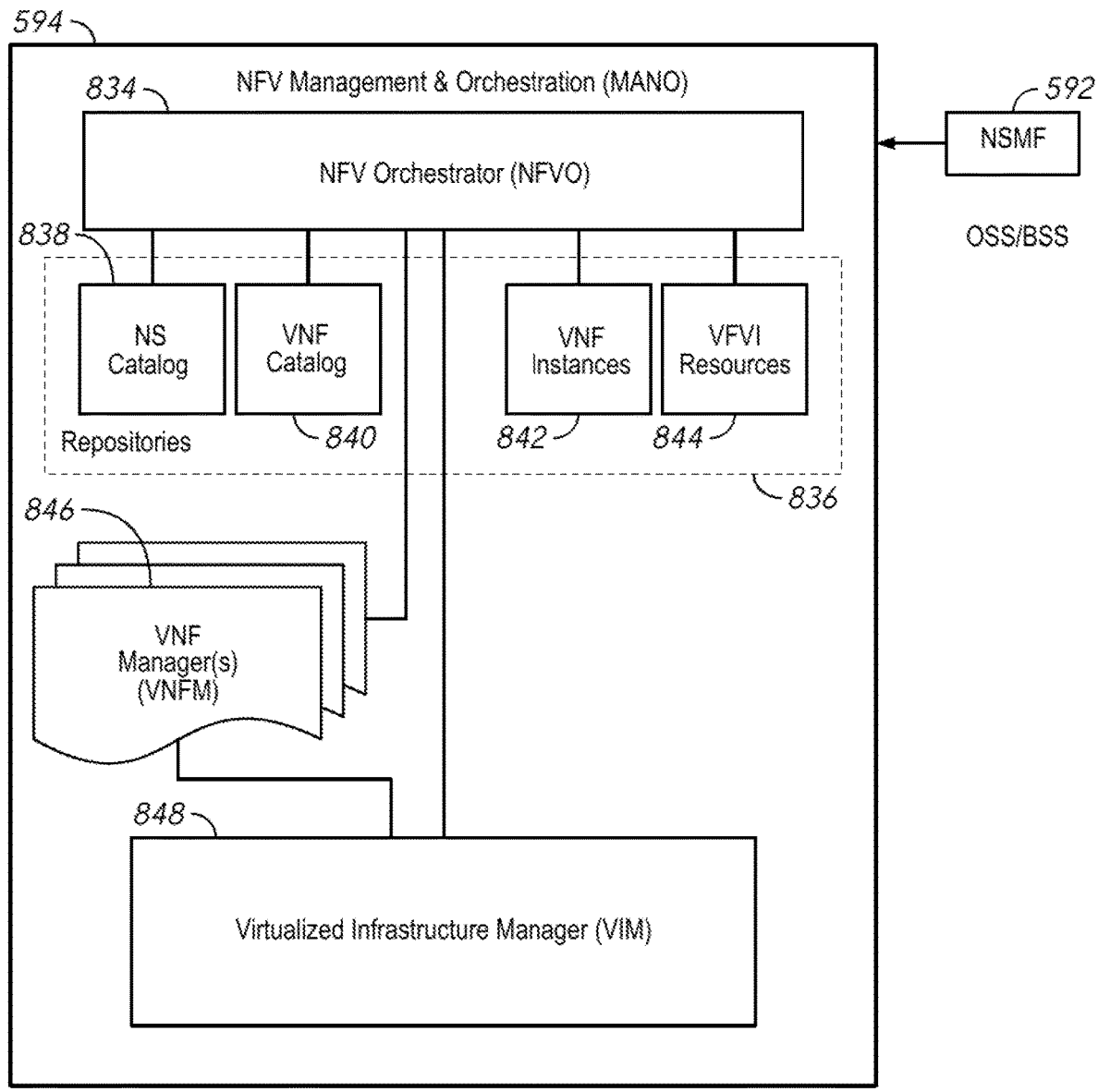
FIG. 8 is an illustrative representation of a network function virtualization management and orchestration (MANO) which may be used according to some implementations of the present disclosure.

FIG. 8 is an illustrative representation of a network function virtualization management and orchestration (MANO) 594 which may be used in at least some implementations of the present disclosure. As described in relation to FIG. 5C, NSMF 592 may be configured to interact and communicate with MANO 594 in the creation of NSIs. MANO 594 is generally configured for the management or orchestration of the instantiation, modification, and teardown of virtualized functions. MANO 594 may generally provide interfaces to existing systems such as an OSS/BSS. MANO 594 may include an orchestrator 834 which can access libraries 836 such as a Network Service catalog 838, a VNF Catalog 840, a VNF Instances repository 842 and NFVI resources repository 844. NS Catalog 838 may include templates that can be used as the basis for supporting network services. VNF catalog 840 may contain templates for the instantiation of different classes of VNFs. A particular VNF, after being instantiated, may be referred to as a VNF instance, and its attributes may be stored in VNF instances repository 842. NFVI resources 844 may be used to track the availability of resources, including both virtual resources and the physical infrastructure upon which they are instantiated. The NFVO 834 may be connected to a number of VNF Managers 846 and to a Virtualized Infrastructure Manager (VIM) 848, and VNFM 846 and VIM 848 may also be connected to each other.

FIGS. 9A-9B are illustrative representations of example mobile network communication routes between AS 180 and IoT device 202 for communications therebetween after MIoT deployment. In FIG. 9A, a first configuration is shown for IP data delivery 902 where an N6 interface of the 5G mobile network terminates at the NEF 150, such that routing to IoT device 202 is provided via NEF 150 and UPF 122. In FIG. 9B, a second configuration for IP data delivery 904 is shown where the N6 interface of the 5G mobile network terminates at AS 180, such that routing to IoT device 202 is provided through UPF 122 but not through NEF 150. In FIG. 9B, a configuration is shown for non-IP data delivery (NIDD) 906 such that routing to IoT device 202 is provided via NEF 150 and AMF 122.

Figure 10:
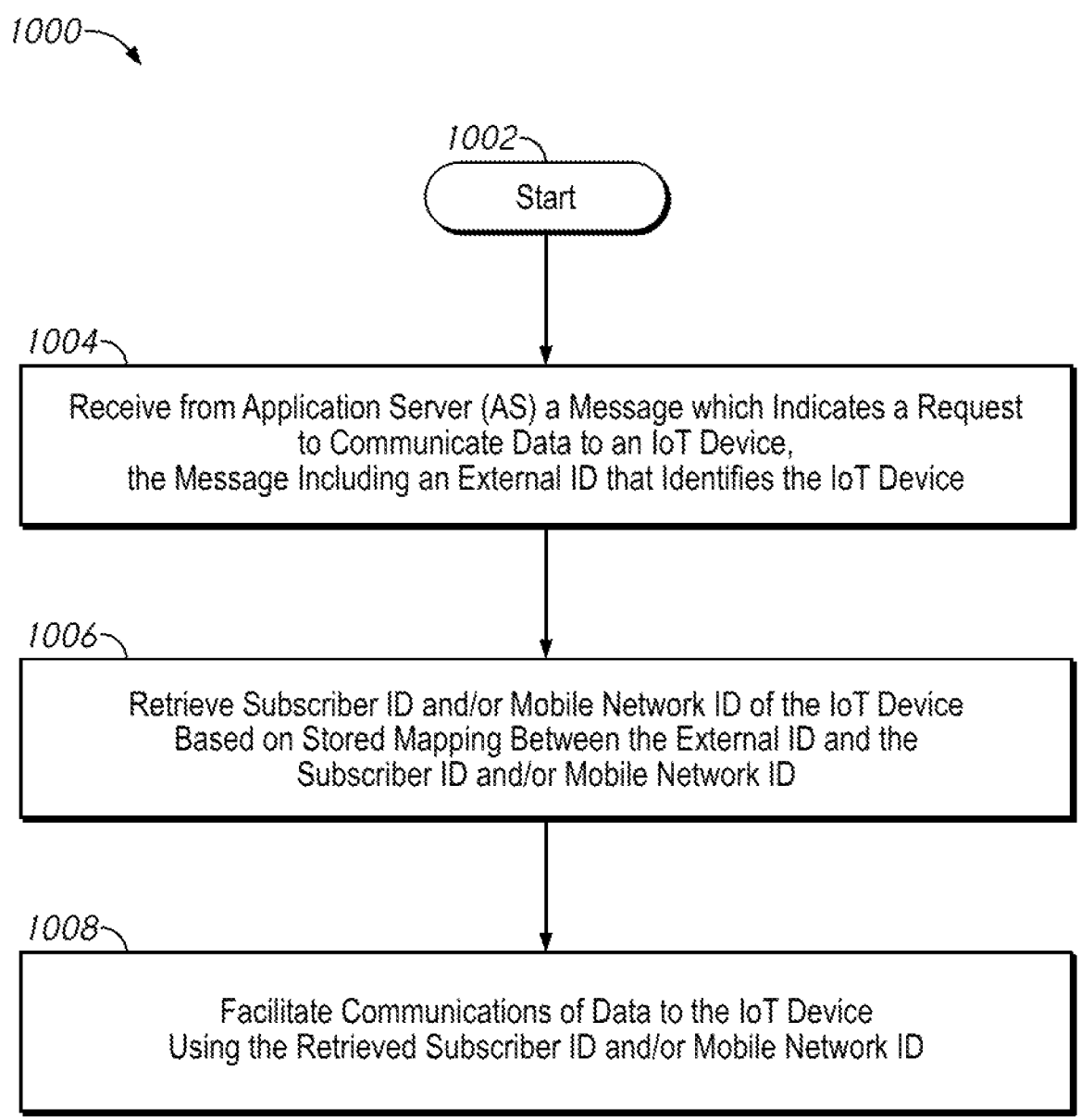
FIG. 10 is a flowchart for describing a method for use in communicating data between an AS and an IoT device, which may be utilized after performance of the processes for MIoT deployment.

FIG. 10 is a flowchart 1000 for describing a method for use in communicating data between an AS and an IoT device with use of an external ID, after MIoT deployment. The IoT device has been assigned a device ID by the manufacturer. Beginning at a start block 1002 of FIG. 10, a network node (e.g. the NEF) may receive from the AS a message which indicates a request to communicate data to the IoT device (step 1004 of FIG. 10). The message may include an external ID assigned to the IoT device having the device ID. The network node may selectively retrieve a subscriber ID and/or mobile network ID of the IoT device based on a stored mapping between the external ID and the subscriber ID and/or mobile network ID (step 1006 of FIG. 10). The network node may cause or otherwise facilitate data communication between the AS and the IoT device using the retrieved subscriber ID and/or mobile network ID (step 1008 of FIG. 10).

Thus, in at least some implementations of the present disclosure, what is provided is a zero-touch bulk external ID creation and provisioning for IoT devices as well as network slice orchestration with minimal input from an enterprise. Such techniques may enable a mobile network to hide the subscriber IDs from application systems and automate the bulk creation of application-aware IDs for service exposure. Further advantageously, the described approach may further enable multiple application-aware identities associated with a SUPI when provisioned in a subscriber database or UDM/UDR. This may even further enable multiple-enterprise BSS systems to benefit from the same network deployment. For example, smart city environmental monitoring sensors may be able collect environment data, and these data may be leveraged across multiple unique applications with unique external IDs that are bulk-provisioned.

Implementations of the present disclosure have been shown in the figures to apply to a 5G mobile network; however, implementations may be readily applied to other suitable types mobile networks, such as 4G, Long Term Evolution (LTE) based networks having a control and user plane separation (CUPS) architecture, as one ordinarily skilled in the art will readily appreciate. In 4G/LTE with CUPS, an NEF may instead be a service capabilities and exposure function (SCEF), and the subscriber database of UDM/UDR may instead be a home subscriber server (HSS) and/or home location register (HLR). As other examples, the UPF may instead be a gateway-user plane (GW-U). the SMF may instead be a GW-control plane (GW-C), the AMF may instead be a mobility management entity (MME), the PCF may instead be a policy and control rules function (PCRF). The SMF and GW-C may be more generally referred to as a CP entity for session management. Other naming conventions may be adopted or realized.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first identity could be termed a second identity, and similarly, a second identity could be termed a first identity, without changing the meaning of the description, so long as all occurrences of the "first identity" are renamed consistently and all occurrences of the "second identity" are renamed consistently. The first identity and the second identity are both identities, but they are not the same identity.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a network node configured for exposure of services and capabilities of a mobile network, and for interfacing with an application server for communication of data via the mobile network,
     for each device identifier (ID) of a plurality of device IDs respectively assigned to a plurality of Internet-of-Things (IoT) devices comprising a group of IoT devices configured for communications with the application server via the mobile network:
       assigning a plurality of identities to a device ID of an IoT device of the group, the identities including an external ID, a subscriber ID, and a mobile network ID;
       storing one or more associations between the device ID and the assigned identities; and
     sending to the application server one or more messages which identify the external IDs respectively assigned to the device IDs for the application server to address the IoT devices for communications therewith.

2. The method of claim 1, further comprising:
   sending, to a subscriber database of the mobile network, one or more messages which identify a group ID of the group, the subscriber IDs, and the mobile network IDs, for storage of the group ID in association with the subscriber IDs and the mobile network IDs.

3. The method of claim 2, further comprising:
   sending to a subscriber identity module (SIM) server one or more messages which identify the subscriber IDs and the device IDs assigned to the IoT devices of the group, for a subsequent provisioning of the IoT devices of the group.

4. The method of claim 3, further comprising:
   receiving from a network slice management function (NSMF) one or more messages which identify network slice selection assistance information (NSSAI) configuration data and a network slice instance (NSI) ID associated with a created NSI; and
   sending to the subscriber database one or more messages which include the group ID of the group and the NSI ID associated with the network slice, for storage of the NSI ID in association with the group ID.

5. The method of claim 4, further comprising:
   sending to a network slice selection function (NSSF) one or more messages which include the NSSAI configuration data and the NSI ID, for storage of the NSSAI configuration data and the NSI ID.

6. The method of claim 5, further comprising:
   deriving network slice selection policies (NSSP) based on a profile of the application server; and
   sending to a policy control function (PCF) one or more messages which include the NSSP, the NSSAI, and a plurality of the subscriber IDs of the group, for storage of the NSSP in association with the NSSAI and the subscriber IDs of the group.

7. The method of claim 1, further comprising:
   receiving, from a server of a business support system (BSS), one or more messages which indicate a request for bulk onboarding of identities for the plurality of IoT devices, and identify the plurality of device IDs assigned to the IoT devices, a plurality of the subscriber IDs, and a plurality of the mobile network IDs.

8. The method of claim 1, further comprising:
receiving, from a server of a business support system (BSS), one or more messages which indicate a request for communication service and identify a communication service description associated with the requested communication service;
selecting network service requirements according to the requested communication service description;
sending to a network slice management function (NSMF) one or more messages which indicate a request for creating a network slice instance (NSI) and associated network functions (NFs) according to the selected network service requirements; and
receiving from the NSMF one or more messages which identify network slice selection assistance information (NSSAI) configuration data and an NSI ID associated with the NSI.

9. The method of claim 1, wherein the subscriber ID comprises an International Mobile Subscriber Identity (IMSI) and the mobile network ID comprises a Mobile Station International Subscriber Directory Number (MSISDN).

10. The method of claim 1, wherein the network node comprises a network exposure function (NEF).

11. A network node configured for exposure of services and capabilities of a mobile network, and for interfacing with an application server for communication of data via the mobile network, the network node comprising:
one or more processors configured to:
for each device identifier (ID) of a plurality of device IDs respectively assigned to a plurality of Internet-of-Things (IoT) devices comprising a group of IoT devices configured for communications with the application server via the mobile network:
assign a plurality of identities to a device ID of an IoT device of the group, the plurality of identities including an external ID, a subscriber ID, and a mobile network ID;
store one or more associations between the device ID and the assigned identities; and
send to the application server one or more messages which identify the external IDs respectively assigned to the device IDs for the application server to address the IoT devices for communications therewith.

12. The network node of claim 11, wherein the one or more processors are further configured to:
send, to a subscriber database of the mobile network, one or more messages which identify a group ID of the group, the subscriber IDs, and the mobile network IDs, for storage of the group ID in association with the subscriber IDs and the mobile network IDs.

13. The network node of claim 12, wherein the one or more processors are further configured to:
send to a subscriber identity module (SIM) server one or more messages which identify the subscriber IDs and the device IDs assigned to the IoT devices of the group, for a subsequent provisioning of the IoT devices of the group with the subscriber IDs.

14. The network node of claim 12, wherein the one or more processors are further configured to:
receive from a network slice management function (NSMF) one or more messages which identify network slice selection assistance information (NSSAI) configuration data and a network slice instance (NSI) ID associated with a created NSI;
send to the subscriber database one or more messages which include the group ID of the group and the NSI ID associated with the created network slice, for storage of the NSI ID in association with the group ID; and
send to a network slice selection function (NSSF) one or more messages which include the NSSAI configuration data and the NSI ID, for storage of the NSSAI configuration data and the NSI ID.

15. The network node of claim 14, wherein the one or more processors are further configured to:
derive network slice selection policies (NSSP) based on a profile of the application server; and
send to a policy control function (PCF) one or more messages which include the NSSP, the NSSAI, and a plurality of the subscriber IDs of the group, for storage of the NSSP in association with the NSSAI and the subscriber IDs of the group.

16. The network node of claim 14, wherein the subscriber ID comprises an International Mobile Subscriber Identity (IMSI) and the mobile network ID comprises a Mobile Station International Subscriber Directory Number (MSISDN).

17. The network node of claim 11, wherein the one or more processors are further configured to:
receive, from a server of a business support system (BSS), one or more messages which indicate a request for bulk onboarding of identities for the plurality of IoT devices, and identify the plurality of device IDs assigned to the IoT devices, a plurality of the subscriber IDs, and a plurality of the mobile network IDs.

18. The network node of claim 11, wherein the one or more processors are further configured to:
receive, from a server of a business support system (BSS), one or more messages which indicate a request for communication service and identify a communication service description associated with the requested communication service;
select network service requirements according to the requested communication service description;
send to a network slice management function (NSMF) one or more messages which indicate a request for creating a network slice instance (NSI) and associated network functions (NFs) according to the selected network service requirements; and
receive from the NSMF one or more messages which identify network slice selection assistance information (NSSAI) configuration data and an NSI ID associated with the NSI.

19. One or more non-transitory computer readable storage media, encoded with instructions that, when executed by a processor of a network node configured for exposure of services and capabilities of a mobile network, and for interfacing with an application server for communication of data via the mobile network, cause the processor to perform operations including:
for each device identifier (ID) of a plurality of device IDs respectively assigned to a plurality of Internet of Thing (IoT) devices comprising a group of IoT devices configured for communications with the application server via the mobile network:
assigning a plurality of identities to a device ID of an IoT device of the group, the identities including an external ID, a subscriber ID, and a mobile network ID;
storing one or more associations between the device ID and the assigned identities; and sending to the application server one or more messages which identify the external IDs respectively assigned to the device IDs for the application server to address the IoT devices for communications therewith.

20. The non-transitory computer readable storage media of claim 19, further including instructions that, when executed, cause the processor of the network node to perform:
sending, to a subscriber database of the mobile network, one or more messages which identify a group ID of the group, the subscriber IDs, and the mobile network IDs, for storage of the group ID in association with the subscriber IDs and the mobile network IDs.

\* \* \* \* \*